United States Patent
Shichino

(10) Patent No.: US 8,972,552 B2
(45) Date of Patent: Mar. 3, 2015

(54) MANAGEMENT APPARATUS, COMMUNICATION APPARATUS, COMPUTER-READABLE STORAGE MEDIUM, METHOD, AND COMMUNICATION SYSTEM

(75) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 12/812,618

(22) PCT Filed: Mar. 23, 2009

(86) PCT No.: PCT/JP2009/056407

§ 371 (c)(1),
(2), (4) Date: Jul. 13, 2010

(87) PCT Pub. No.: WO2009/123075

PCT Pub. Date: Oct. 8, 2009

(65) Prior Publication Data

US 2010/0299428 A1    Nov. 25, 2010

(30) Foreign Application Priority Data

Apr. 1, 2008   (JP) ................. 2008-095433

(51) Int. Cl.
 G06F 15/177 (2006.01)
 H04W 8/00 (2009.01)
(52) U.S. Cl.
 CPC .................... H04W 8/005 (2013.01)
 USPC ............. 709/223; 709/249; 709/228
(58) Field of Classification Search
 USPC ................. 709/223, 227–228, 249–250
 See application file for complete search history.

(56) References Cited

U.S. PATENT DOCUMENTS

| | | | |
|---|---|---|---|
| 7,672,278 B2 | 3/2010 | Gassho et al. | |
| 8,559,350 B2 | 10/2013 | Kuehnel et al. | |
| 2003/0100335 A1 | 5/2003 | Gassho et al. | |
| 2004/0006618 A1* | 1/2004 | Kasai et al. | 709/223 |
| 2005/0055466 A1* | 3/2005 | Matsuno et al. | 709/249 |
| 2005/0135286 A1* | 6/2005 | Nurminen et al. | 370/310 |
| 2006/0221903 A1* | 10/2006 | Kauranen et al. | 370/331 |
| 2007/0141988 A1 | 6/2007 | Kuehnel et al. | |
| 2008/0037495 A1* | 2/2008 | Anjum et al. | 370/338 |

(Continued)

FOREIGN PATENT DOCUMENTS

| | | | |
|---|---|---|---|
| EP | 1895787 A1 | 3/2008 | |
| JP | 2003-163668 A | 6/2003 | |

(Continued)

OTHER PUBLICATIONS

Aug. 20, 2010 International Search Report and Written Opinion in International Patent Appln. No. PCT/JP2009/056407.

*Primary Examiner* — Abdullahi Salad

(74) *Attorney, Agent, or Firm* — Fitzpatrick, Cella, Harper & Scinto

(57) ABSTRACT

A management apparatus characterized by comprising: management means for managing a connection parameter associated with a second network which is newly formed by a communication apparatus connected to a first network and is different from the first network; and notification means for, upon receiving a request from another communication apparatus connected to the first network, notifying the request source communication apparatus of the connection parameter associated with the second network, which is managed by the management means.

11 Claims, 17 Drawing Sheets

(56) References Cited

U.S. PATENT DOCUMENTS

2008/0147882 A1* 6/2008 Reif et al. .................. 709/238
2008/0192709 A1* 8/2008 Mikami et al. ............. 370/338
2008/0281952 A1* 11/2008 Fedotenko .................. 709/223
2010/0211678 A1* 8/2010 McDysan et al. ........... 709/225

FOREIGN PATENT DOCUMENTS

| JP | 2005-191721 A | 7/2005 |
| JP | 2007-259385 A | 10/2007 |
| WO | 02/39484 A2 | 5/2002 |
| WO | 2007/136622 A2 | 11/2007 |

* cited by examiner

FIG. 4

| PARAMETER NUMBER | SSID | CHANNEL | ENCRYPTION METHOD | ENCRYPTION KEY |
|---|---|---|---|---|
| 1 | aa | 7 | AES | ddd |
| 2 | bb | 1 | WEP | eee |

F I G. 5

| 500 | 501 | 502 | 503 | 504 | 505 |
|---|---|---|---|---|---|
| TERMINAL NUMBER | UUID | Device Description | MAC ADDRESS | IP ADDRESS | PARAMETER NUMBER |
| 1 | Display | Canon : xxxx | gg : gg : gg : gg : gg : gg | 192.168.30.3 | 1 |
| 2 | DVC | Canon : yyyy | hh : hh : hh : hh : hh : hh | 192.168.30.4 | 1 |
| 3 | Printer | Canon : xxxx | kk : kk : kk : kk : kk : kk | 192.168.30.5 | 2 |
| 4 | PC | abc : zzz | mm : mm : mm : mm : mm : mm | 192.168.30.6 | 2 |
| 5 | DSC | Canon : zzz | nn : nn : nn : nn : nn : nn | 192.168.30.7 | 1 |

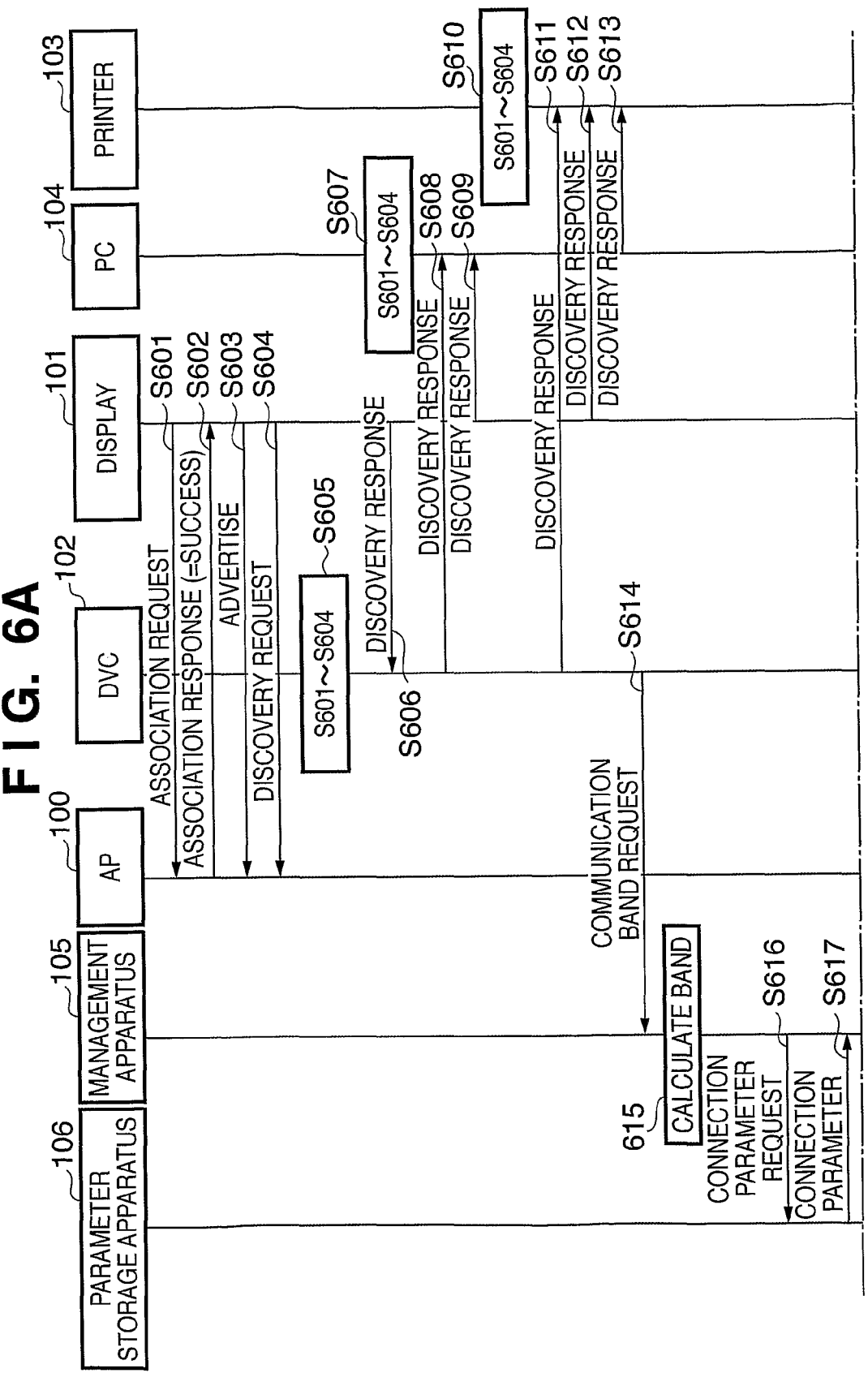

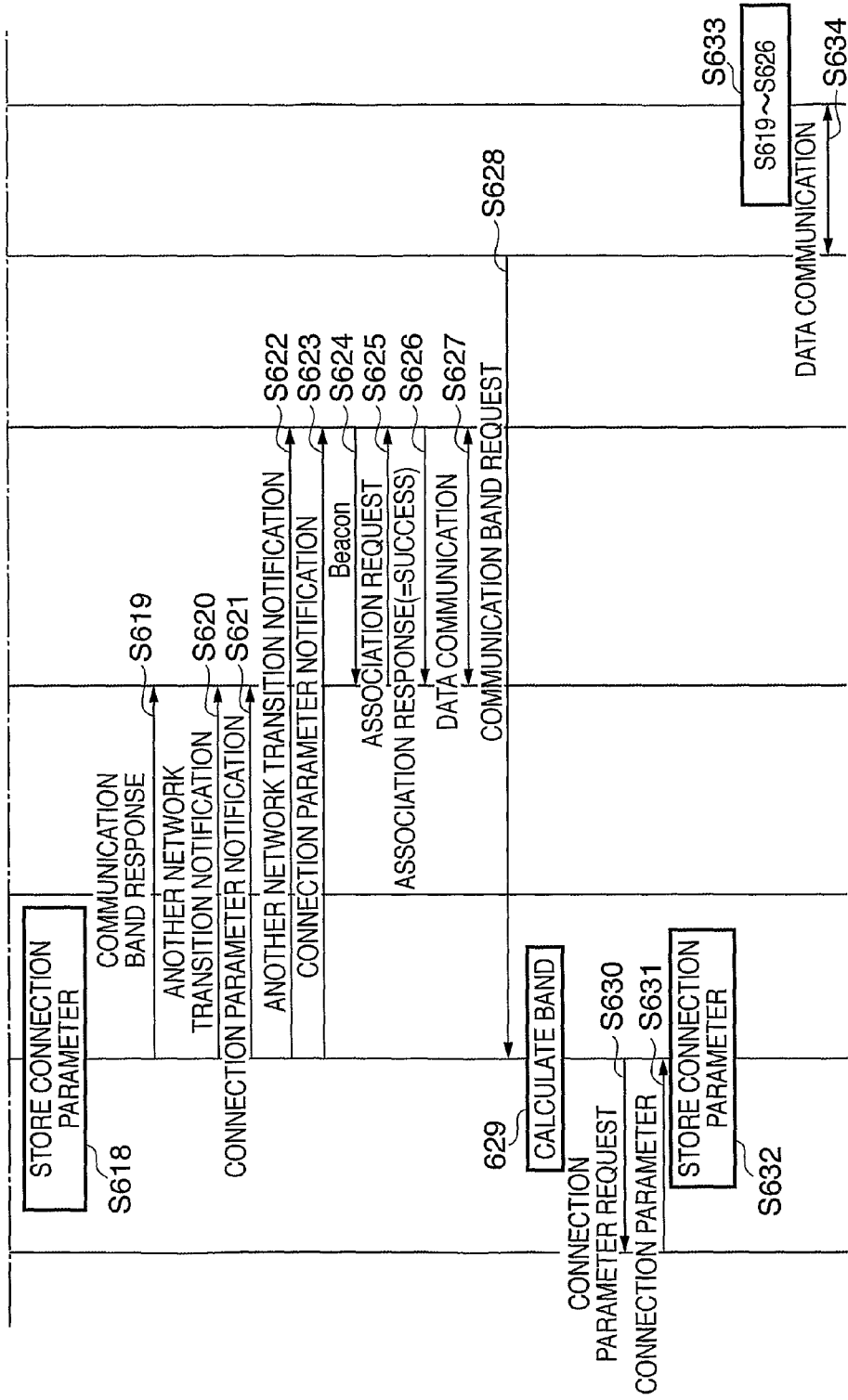

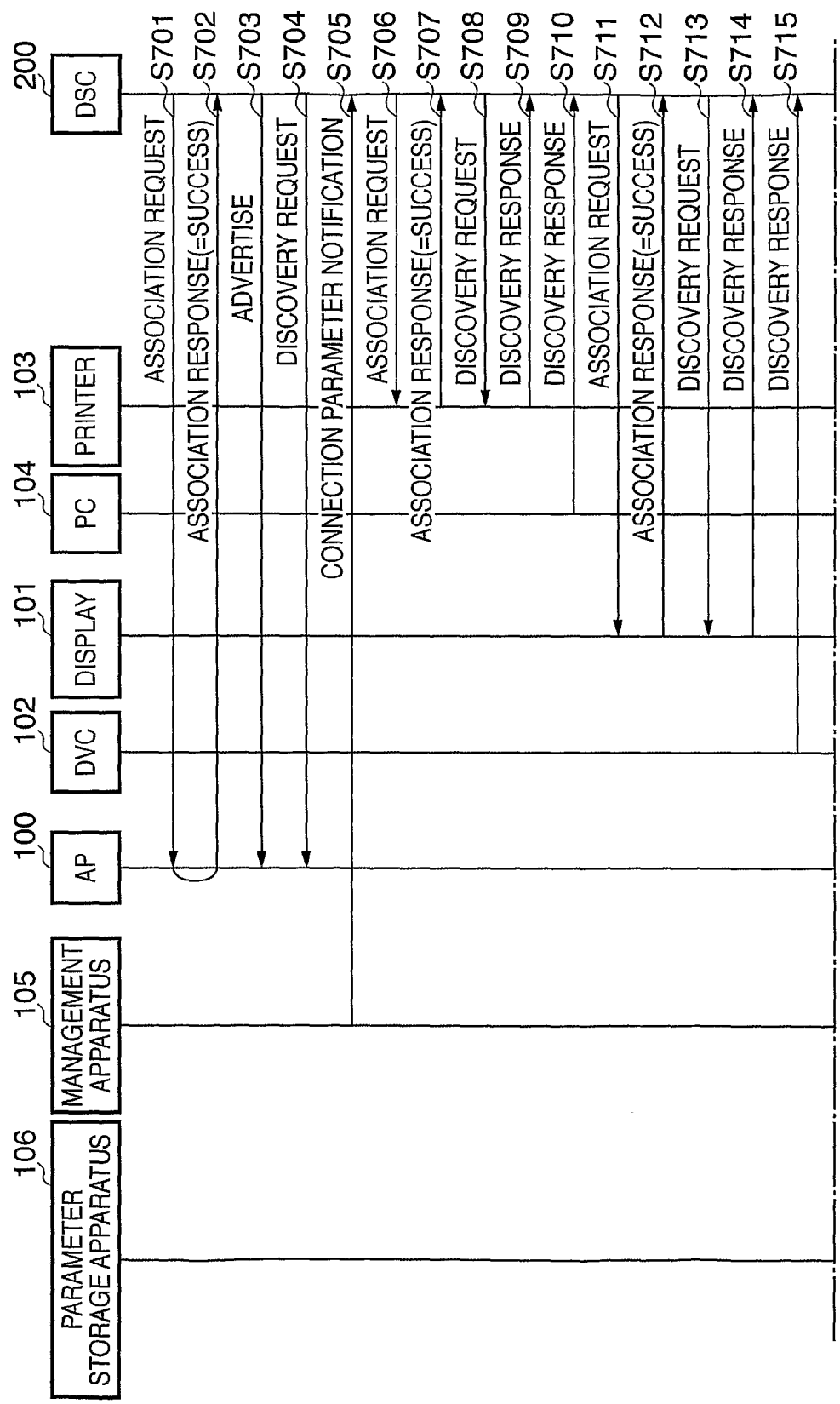

F I G. 15

| 500 | 501 | 502 | 503 | 504 | 505 | 1500 |
|---|---|---|---|---|---|---|
| TERMINAL NUMBER | UUID | Device Description | MAC ADDRESS | IP ADDRESS | PARAMETER NUMBER | CONNECTION FORM |
| 1 | Display | Canon : xxxx | gg : gg : gg : gg : gg : gg | 192.168.30.3 | 1 | WIRELESS |
| 2 | DVC | Canon : yyyy | hh : hh : hh : hh : hh : hh | 192.168.30.4 | 1 | WIRELESS |
| 3 | Printer | Canon : xxxx | kk : kk : kk : kk : kk : kk | 192.168.30.5 | 2 | WIRELESS |
| 4 | PC | abc: zzz | mm : mm : mm : mm : mm : mm | 192.168.30.6 | 2 | WIRELESS |
| 5 | DSC | Canon : zzz | nn : nn : nn : nn : nn : nn | 192.168.30.7 | 1 | WIRELESS |
| 6 | PC2 | def : www | mm : mm : mm : mm : mm : mm | 192.168.30.8 |  | WIRED |

| 401 | 402 | 403 | 404 | 405 | 1600 |
|---|---|---|---|---|---|
| PARAMETER NUMBER | SSID | CHANNEL | ENCRYPTION METHOD | ENCRYPTION KEY | CONNECTION FORM |
| 1 | aa | 7 | AES | ddd | WIRELESS |
| 2 | bb | 1 | WEP | eee | WIRELESS |

MANAGEMENT APPARATUS, COMMUNICATION APPARATUS, COMPUTER-READABLE STORAGE MEDIUM, METHOD, AND COMMUNICATION SYSTEM

TECHNICAL FIELD

The present invention relates to a management apparatus, communication apparatus, computer-readable storage medium, method, and communication system.

BACKGROUND ART

Along with the penetration of a wireless LAN (Local Area Network), a communication terminal supporting the wireless LAN has increased the variety of functions. For example, a Dual mode terminal having both the function of an access point (to be abbreviated as "AP" hereinafter) and that of a station (to be abbreviated as "STA" hereinafter) of a wireless LAN has been developed.

As a characteristic feature, a Dual mode terminal can effectively use the wireless band. For example, there has been proposed a technique of enabling a Dual mode terminal, which is connected to an AP and is going to communicate with an STA under the control of the same AP, to secede from the AP, form another network by activating an AP mode, and communicate with the STA of the communication partner without intervening the AP. A technique of causing an STA to acquire the connection parameters of a network has also been proposed, in which a server apparatus on the network transmits the connection parameters necessary for connection to an AP in response to a request from the STA (Japanese Patent Laid-Open No. 2005-191721).

FIG. 1 shows a network configuration including Dual mode terminals.

A DISPLAY 101 and a PRINTER 103 are Dual mode terminals which operate in an STA mode. A DVC 102 and a PC 104 are STAs. The DISPLAY 101, the PRINTER 103, the DVC 102, the PC 104, a parameter storage apparatus 106, and a management apparatus 105 are connected to a network connectable to an AP 100. The network connectable to the AP 100 will be referred to as a home network here.

The management apparatus 105 manages the communication band of the home network. Assume that the DVC 102 starts communication with the DISPLAY 101, and the PC 104 starts communication with the PRINTER 103. To effectively use the communication band, the management apparatus 105 instructs the terminals under the control of the AP 100 to form other networks that are different from the home network. FIG. 2 shows a network configuration at that time. The DISPLAY 101 and the PRINTER 103 transit from the STA mode to the AP mode and separately form networks. Assume that a DSC 200 is connected to the home network in this state, desiring communication with the DVC 102. In this case, the DSC 200 cannot communicate with the DVC 102 because it is connected to another network.

DISCLOSURE OF INVENTION

The present invention enables providing a technique of allowing a communication terminal connected to a second network formed by a communication terminal seceded from a first network to communicate with a communication terminal connected to the first network.

According to a first aspect of the present invention, there is provided a management apparatus characterized by comprising: management means for managing a connection parameter associated with a second network which is newly formed by a communication apparatus connected to a first network and is different from the first network; and notification means for, upon receiving a request from another communication apparatus connected to the first network, notifying the request source communication apparatus of the connection parameter associated with the second network, which is managed by the management means.

According to a second aspect of the present invention, there is provided a communication apparatus connected to a first network, characterized by comprising: transmission means for transmitting a request to a management apparatus; reception means for receiving, from the management apparatus as a response to the request transmitted by the transmission means, connection parameters associated with second networks which are newly formed by other communication apparatuses and are different from the first network; and connection means for connecting to each of the second networks using the connection parameters associated with all the second networks which are received by the reception means.

According to a third aspect of the present invention, there is provided a computer-readable storage medium storing a computer program, the computer program causing a computer to function as: management means for managing a connection parameter associated with a second network which is newly formed by a communication apparatus connected to a first network and is different from the first network; and notification means for, upon receiving a request from another communication apparatus connected to the first network, notifying the request source communication apparatus of the connection parameter associated with the second network, which is managed by the management means.

According to a fourth aspect of the present invention, there is provided a computer-readable storage medium storing a computer program, the computer program causing a computer connected to a first network to function as: transmission means for transmitting a request to a management apparatus; reception means for receiving, from the management apparatus as a response to the request transmitted by the transmission means, connection parameters associated with second networks which are newly formed by other communication apparatuses and are different from the first network; and connection means for connecting to each of the second networks using the connection parameters associated with all the second networks which are received by the reception means.

According to a fifth aspect of the present invention, there is provided a management method of a management apparatus, characterized by comprising: a management step of managing a connection parameter associated with a second network which is newly formed by a communication apparatus connected to a first network and is different from the first network; and a notification step of, upon receiving a request from another communication apparatus connected to the first network, notifying the request source communication apparatus of the connection parameter associated with the second network, which is managed in the management step.

According to a sixth aspect of the present invention, there is provided a communication method of a communication apparatus connected to a first network, characterized by comprising: a transmission step of transmitting a request to a management apparatus; a reception step of receiving, from the management apparatus as a response to the request transmitted in the transmission step, connection parameters associated with second networks which are newly formed by other communication apparatuses and are different from the first network; and a connection step of connecting to each of the second networks using the connection parameters associated with all the second networks which are received in the reception step.

According to a seventh aspect of the present invention, there is provided a communication system including a communication apparatus and a management apparatus, characterized in that the management apparatus comprises: management means for managing a connection parameter associated with a second network which is newly formed by a communication apparatus connected to a first network and is different from the first network; and notification means for, upon receiving a request from another communication apparatus connected to the first network, notifying the request source communication apparatus of the connection parameter associated with the second network, which is managed by the management means, and the communication apparatus comprises: reception means for receiving the connection parameter notified by the notification means; and connection means for connecting to each of the second networks using the connection parameters associated with all the second networks which are received by the reception means.

Further features of the present invention will become apparent from the following description of exemplary embodiments with reference to the attached drawings.

BRIEF DESCRIPTION OF DRAWINGS

FIG. 4 is a view showing an example of the data structure of connection parameter information managed by a connection parameter management unit 305 shown in FIG. 3;

FIG. 5 is a view showing an example of the data structure of STA information managed by an STA management unit 307 shown in FIG. 3;

FIGS. 6A and 6B are first sequence charts showing an example of the sequence of processing in the communication system shown in FIGS. 1 and 2;

FIGS. 7A and 7B are second sequence charts showing an example of the sequence of processing in the communication system shown in FIGS. 1 and 2;

FIG. 15 is a view showing an example of the data structure of STA information according to the fourth embodiment;

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
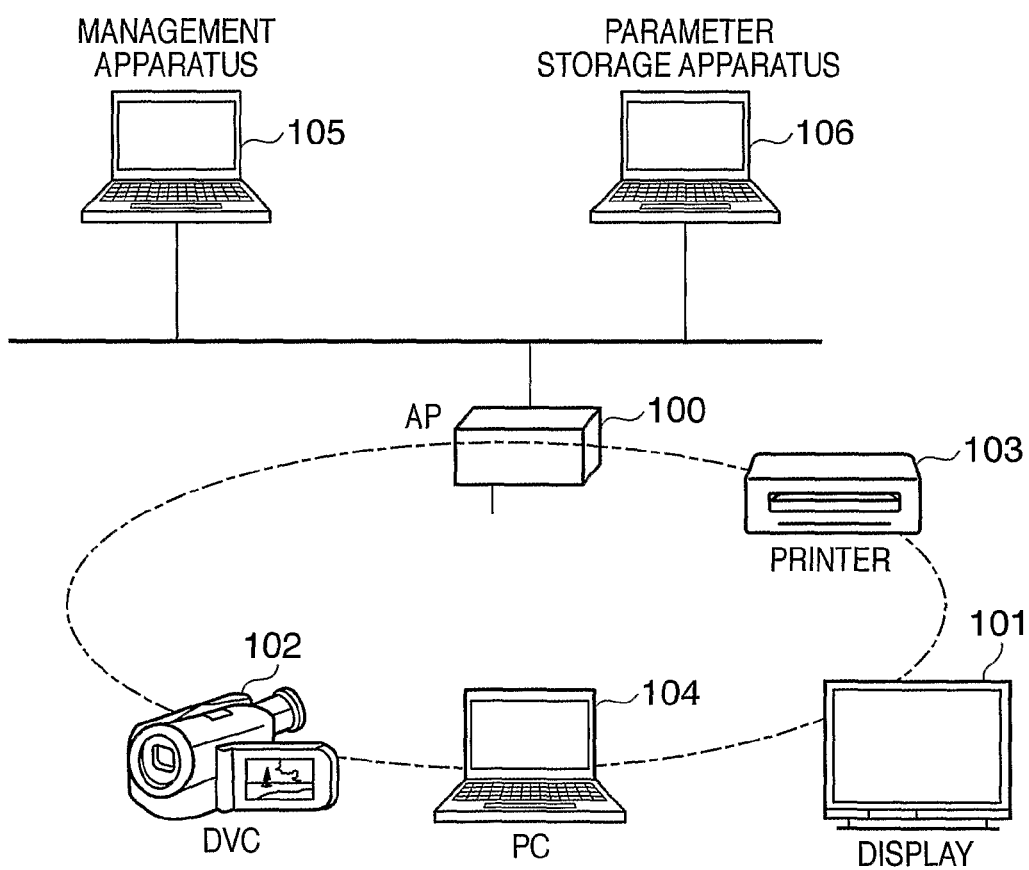
FIG. 1 is a first view showing an example of the overall arrangement of a communication system according to an embodiment of the present invention.
Figure 2:
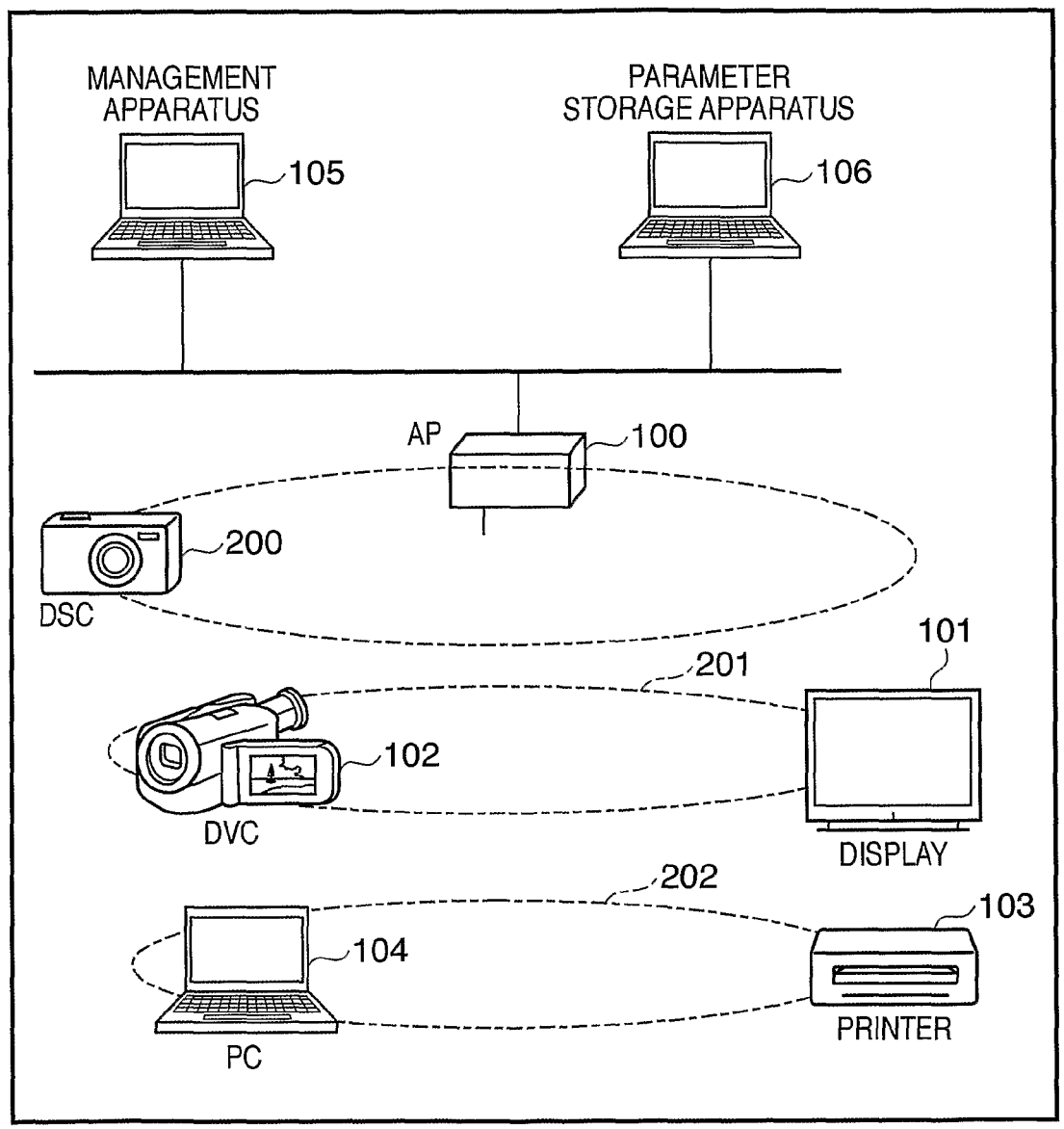
FIG. 2 is a second view showing an example of the overall arrangement of a communication system according to an embodiment of the present invention.

FIGS. 1 and 2 are views showing an example of the overall arrangement of a communication system according to an embodiment of the present invention.

Referring to FIG. 1, a management apparatus 105 and terminals are connected to a home network (to be referred to as a first network hereinafter). A DISPLAY 101, DVC 102, PRINTER 103, and PC 104 serving as STAs are connected to an AP 100. The DISPLAY 101 and the PRINTER 103 are Dual mode terminals having both the functions of an AP and an STA.

The management apparatus 105 manages the terminals and the communication band of the whole network. A parameter storage apparatus 106 stores connection parameters to be used by the DISPLAY 101 and the PRINTER 103, that is, the Dual mode terminals to operate in the AP mode. The DISPLAY 101, DVC 102, PRINTER 103, and PC 104 support UPnP (Universal Plug and Play) that is a device search protocol.

FIG. 2 shows a configuration in which each of the DISPLAY 101 and the PRINTER 103 forms a network (to be referred to as a second network hereinafter) different from the first network of the AP 100 by activating the AP mode. Note that a second network is formed based on an instruction from the management apparatus 105. A description will be made here defining the network formed by the DISPLAY 101 as a second network 201, and the network formed by the PRINTER 103 as a second network 202. After formation of the two second networks 201 and 202, a DSC 200 is newly connected to the first network to communicate with the DVC 102.

Figure 3:
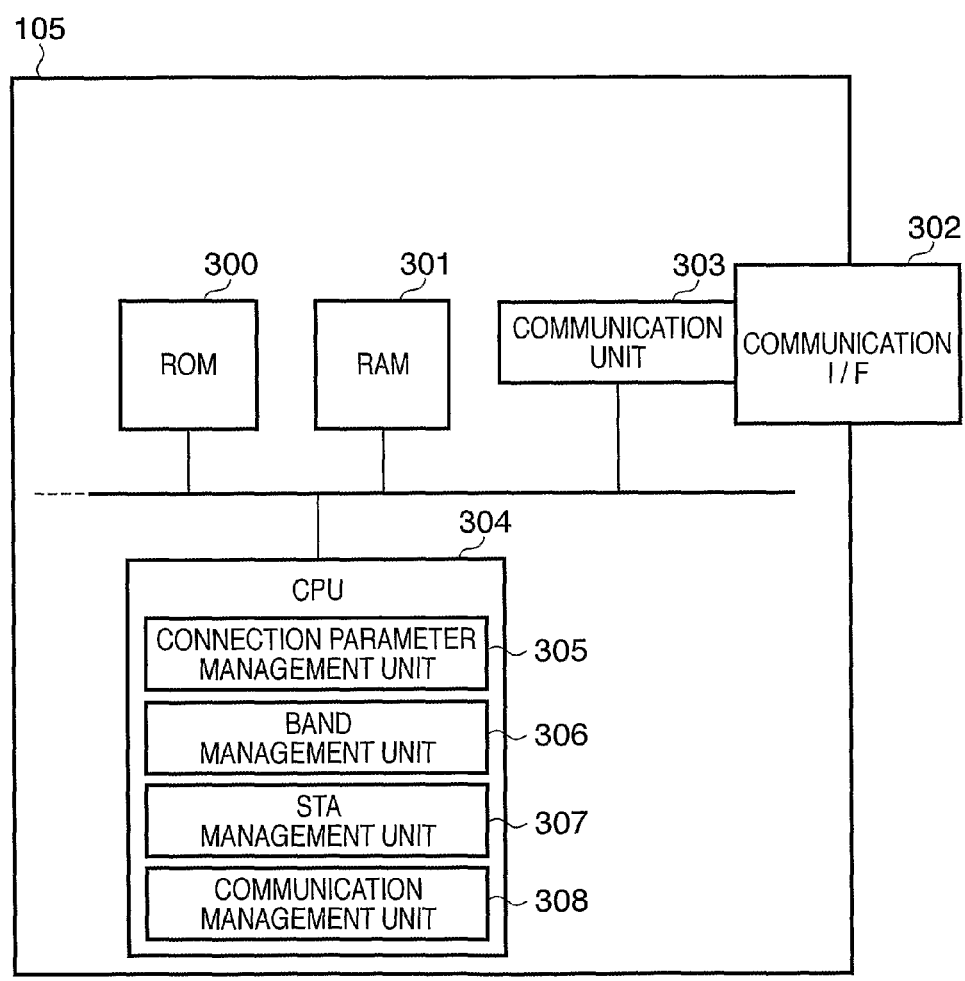
FIG. 3 is a block diagram showing an example of the arrangement of a management apparatus 105 shown in FIGS. 1 and 2.

FIG. 3 is a block diagram showing an example of the arrangement of the management apparatus 105 shown in FIGS. 1 and 2.

A ROM 300 stores, for example, a program to operate the management apparatus 105. A RAM 301 has an area to expand the above-described program. A communication unit 303 performs communication via a communication I/F 302 using, for example, the first network. A CPU 304 controls the entire management apparatus 105. Examples of functional components implemented by the CPU 304 are illustrated in the CPU 304. The functional components implemented by the CPU 304 are mainly implemented by causing the CPU 304 to read out and execute programs stored in the ROM 300 and the like.

The CPU 304 implements, as functional components, a connection parameter management unit 305, band management unit 306, STA management unit 307, and communication management unit 308. The connection parameter management unit 305 manages information (to be referred to as connection parameter information hereinafter) about connection parameters used in a second network. The band management unit 306 manages information (to be referred to as band information hereinafter) about the communication band in a network. The STA management unit 307 manages information (to be referred to as STA information hereinafter) about each communication terminal. Note that the connection parameter management unit 305, band management unit 306, and STA management unit 307 store the connection parameter information, band information, and STA information in, for example, the RAM 301 and manage them. The communication management unit 308 collectively manages communication processing in each communication terminal.

The management apparatus 105 has been described above. Even the communication terminal such as the DISPLAY 101, DVC 102, PRINTER 103, or PC 104 incorporates a computer including a CPU, ROM, RAM, and communication I/F, like the management apparatus 105.

FIG. 4 shows an example of the data structure of connection parameter information managed by the connection parameter management unit 305 shown in FIG. 3. A parameter number is the serial number of a connection parameter. The connection parameter management unit 305 stores an SSID 402, channel 403, encryption method 404, and encryption key 405 in, for example, the RAM 301 and manages them in correspondence with a serial number 401. In the example shown in FIG. 4, connection parameters corresponding to serial numbers "1" and "2" are managed as connection parameters to the second networks, indicating that a plurality of connection parameters are managed.

FIG. 5 shows an example of the data structure of STA information managed by the STA management unit 307 shown in FIG. 3. A terminal number 500 is the serial number of a communication terminal in the network. The STA management unit 307 stores STA information in, for example, the RAM 301 and manages it in correspondence with the terminal number 500. A UUID 501 and a Device Description 502 are the information elements of a UPnP message. Additionally, a MAC address 503, IP address 504, and parameter number 505 are stored. The parameter number 505 manages the parameter number 401 corresponding to a connection parameter used by a communication terminal which is connected to a second network. That is, the parameter number 505 corresponds to the parameter number 401 shown in FIG. 4, which is managed by the connection parameter management unit 305.

FIGS. 6A, 6B, 7A and 7B show an example of the sequence of processing in the communication system shown in FIGS. 1 and 2.

The sequence of processing of transiting from the network configuration shown in FIG. 1 to that shown in FIG. 2 will be described first with reference to FIGS. 6A and 6B.

The DISPLAY 101 sends a connection request (to be referred to as an association request hereinafter) to the AP 100 (S601). The AP 100 transmits an association response (=success) to the DISPLAY 101 (S602). The DISPLAY 101 multicasts an ADVERTISE as a UPnP message (S603), thereby sending its device information to the network.

Upon receiving the ADVERTISE transmitted from the DISPLAY 101, the management apparatus 105 causes the STA management unit 307 to manage, as STA information, the UUID, Device Description, MAC address, and IP address of the DISPLAY 101. Note that the parameter number 505 is an item to be updated when a communication terminal forms a second network (on the basis of an instruction from the management apparatus 105), and therefore stores no value at the present time. After transmitting the ADVERTISE, the DISPLAY 101 transmits a search request (to be referred to as a DISCOVERY request hereinafter) to search for a device supporting the UPnP protocol in the network (S604).

The DVC 102 sends an association request to the AP 100, like the above-described DISPLAY 101. The same step numbers as those of the operations of the DISPLAY 101 denote the same operations of the DVC 102, and a description thereof will be omitted. After receiving an association response from the AP 100, the DVC 102 multicasts an ADVERTISE. Upon receiving the ADVERTISE, the management apparatus 105 causes the STA management unit 307 to manage, as STA information, the UUID, Device Description, MAC address, and IP address of the DVC 102, like the above-described DISPLAY 101.

The DISPLAY 101 transmits a DISCOVERY response corresponding to the DISCOVERY request multicast by the DVC 102 in step S605 (S606). The DISCOVERY response includes UPnP information elements such as the UUID and Device Description of the DISPLAY 101. This makes the DVC 102 recognize the existence of the DISPLAY 101. The PC 104 and the PRINTER 103 are also connected to the AP 100 and then transmit an ADVERTISE, like the DISPLAY 101 and DVC 102 described above. Each of the PC 104 and the PRINTER 103 transmits a DISCOVERY request and receives a DISCOVERY response corresponding to it (S607 to S613).

Assume that the DVC 102 requests a communication band of the management apparatus 105 to execute an application for, for example, the DISPLAY 101 (S614). Upon receiving the request, the management apparatus 105 causes the communication management unit 308 to calculate whether allocation of the requested communication band is possible (S615). This calculation is performed based on band information managed by the band management unit 306. Assume that the communication management unit 308 in the management apparatus 105 determines that communication band allocation is possible, but the DISPLAY 101 needs to newly form a second network. In this case, the management apparatus 105 requests, of the parameter storage apparatus 106, a connection parameter to be used in the second network 201 (S616), and receives the connection parameter (S617).

Upon receiving the connection parameter, the management apparatus 105 causes the connection parameter management unit 305 to manage the received connection parameter as connection parameter information (S618). Note that the connection parameter of the second network 201 corresponds to "1" of the parameter number 401 in FIG. 4. After receiving the connection parameter, the management apparatus 105 sends a communication band response (S619) and a second network transition notification (S620) to the DVC 102, thereby causing the DVC 102 to transit to the second network 201.

The management apparatus 105 also notifies the DISPLAY 101 of the transition to the second network 201 (S622), and sends a connection parameter notification to the DVC 102 and the DISPLAY 101 (S621 and S623). The connection parameter sent to the DVC 102 and the DISPLAY 101 at this time corresponds to "1" of the parameter number 401 in FIG. 4. Then, the management apparatus 105 causes the STA management unit 307 to write, in the parameter numbers 505 of the DVC 102 and the DISPLAY 101, "1" that is the parameter number 401 in the second network 201.

Upon receiving the connection parameter, the DISPLAY 101 activates the AP mode and transmits a beacon (S624). Upon receiving the beacon, the DVC 102 sends an association request to the DISPLAY 101 (S625), receives an association response (=success) corresponding to it (S626), and establishes connection to the DISPLAY 101. After establishing the connection, the DVC 102 starts data communication with the DISPLAY 101 (S627).

Assume that the PC 104 requests a communication band of the management apparatus 105 to execute an application for, for example, the PRINTER 103 (S628). Upon receiving the request, the management apparatus 105 causes the communication management unit 308 to calculate whether allocation of the requested communication band is possible (S629). Assume that the communication management unit 308 in the management apparatus 105 determines that communication band allocation is possible, but the PRINTER 103 needs to newly form the second network 202. In this case, the management apparatus 105 requests, of the parameter storage apparatus 106, a connection parameter to be used in the second network 202 (S630), and receives the connection parameter (S631).

Upon receiving the connection parameter, the management apparatus 105 causes the connection parameter management unit 305 to manage the received connection parameter as connection parameter information (S632). The connection parameter of the second network 202 corresponds to "2" of the parameter number 401 in FIG. 4. Then, the management apparatus 105, the PC 104, and the PRINTER 103 execute the same processing as in steps S619 to S623 described above. More specifically, the management apparatus 105 sends a communication band response to the PC 104, notifies the PC 104 and the PRINTER 103 of the transition to the second network 202, and sends the connection parameter of the second network 202. Upon receiving the connection parameter, each of the PC 104 and the PRINTER 103 executes the same processing as in steps S624 to S626 described above, and starts data communication (S633 and S634). At this time, the management apparatus 105 causes the STA management unit 307 to write, in the parameter numbers 505 of the PC 104 and the PRINTER 103, "2" that is the parameter number 401 in the second network 202.

Figure 7B:
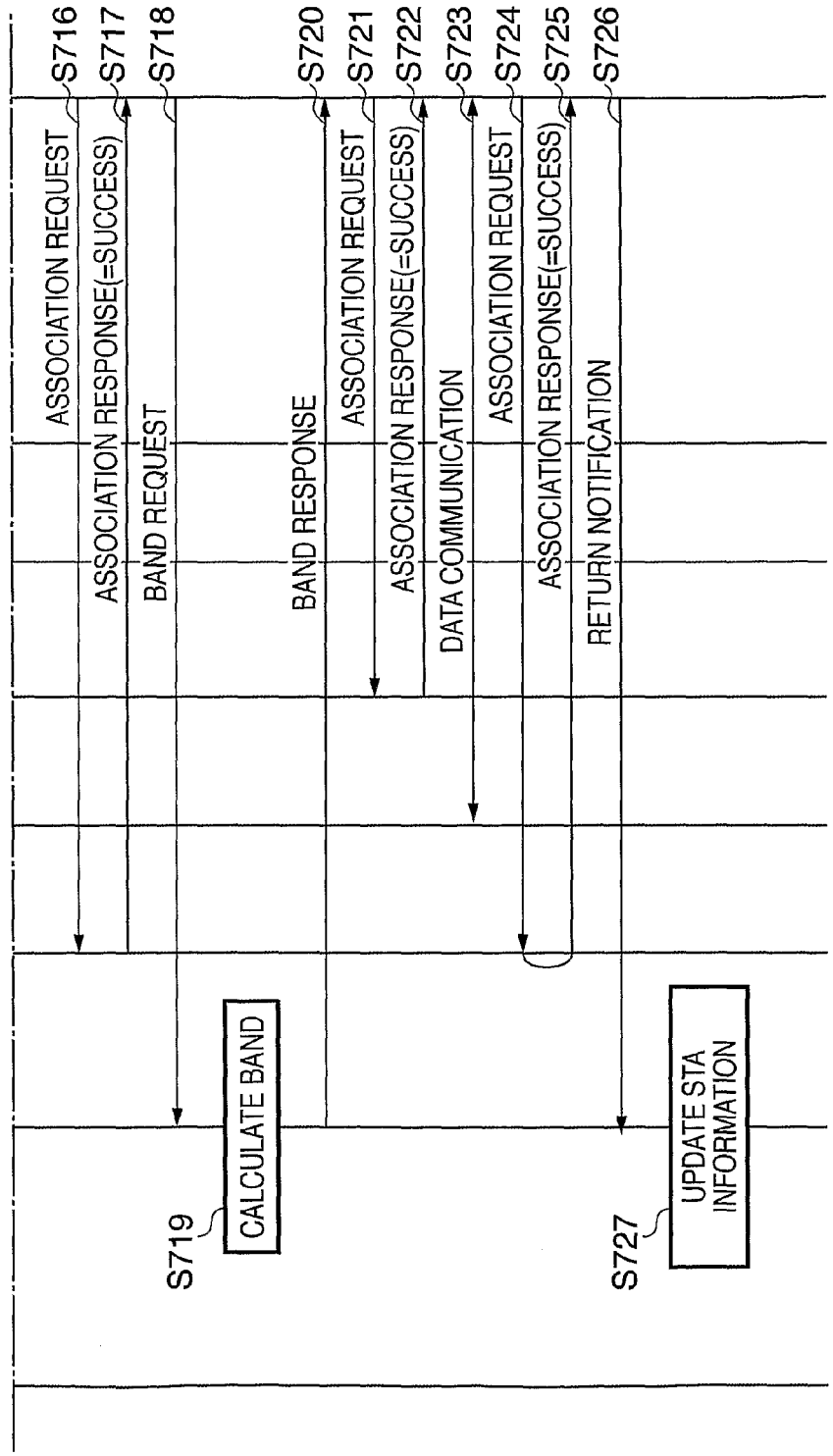

The sequence of processing of causing the DSC 200 to communicate with the DVC 102 in the network configuration shown in FIG. 2 will be described next with reference to FIGS. 7A and 7B. More specifically, an example will be described in which the DVC 102 which has changed the connection from the first network to the second network 201 communicates with the DSC 200 which has newly joined the first network after the connection change.

Assume that the DSC 200 is connected to the AP 100 to execute an application for, for example, the DVC 102 (S701). Upon receiving an association response (=success) from the AP 100 (S702), the DSC 200 multicasts an ADVERTISE (S703). Upon receiving the ADVERTISE, the management apparatus 105 causes the STA management unit 307 to manage, as STA information, the UUID 501, Device Description 502, MAC address 503, and IP address 504 of the DSC 200.

The DSC 200 multicasts a DISCOVERY request to the first network (S704). Upon receiving the DISCOVERY request, the management apparatus 105 causes the connection parameter management unit 305 to refer to the connection parameters used in the second networks. In this case, the connection parameter management unit 305 manages, as the connection parameters of the second networks, the connection parameters of the second networks 201 and 202. The management apparatus 105 causes the communication management unit 308 to send the connection parameters associated with all second networks to the DSC 200 of the DISCOVERY request source (S705). In this case, the connection parameters of the second networks 201 and 202 are transmitted to the DSC 200 as all connection parameters.

The DSC 200 is connected to each of the second networks 201 and 202 using the connection parameters received in step S705 and transmits a DISCOVERY request in each network. More specifically, the DSC 200 is connected to the second network 202 including the PRINTER 103 as an AP (S706 and S707), and transmits a DISCOVERY request (S708). Each of the PRINTER 103 and the PC 104 transmits a DISCOVERY response corresponding to the DISCOVERY request (S709 and S710). Then, the DSC 200 is connected to the second network 201 including the DISPLAY 101 as an AP (S711 and S712), and transmits a DISCOVERY request (S713). Each of the DISPLAY 101 and the DVC 102 transmits a DISCOVERY response corresponding to the DISCOVERY request (S714 and S715).

The DSC 200 recognizes based on the DISCOVERY response from the DVC 102 in step S715 that the DVC 102 exists in the second network 201. To allocate a communication band to the DVC 102, the DSC 200 is connected to the AP 100 of the first network (S716 and S717), and requests the band between the DSC 200 and the DVC 102 of the management apparatus 105 (S718).

Upon receiving the band request, the management apparatus 105 causes the communication management unit 308 to calculate the band (S719). The management apparatus 105 also causes the STA management unit 307 to write, in the parameter number 505 of the STA information with the terminal number 500 "5 (DSC 200)", "1" that is the same as the parameter number 505 of the DVC 102. After the write, the communication band is sent to the DSC 200 (S720).

Upon receiving the band response, the DSC 200 is connected to the second network 201 again (S721 and S722), and starts data communication with the DVC 102 (S723). When the data communication with the DVC 102 has ended, the DSC 200 is connected to the first network (S724 and S725), and transmits a return notification to the management apparatus 105 (S726).

Upon receiving the return notification, the management apparatus 105 causes the band management unit 306 to free the communication band between the DSC 200 and the DVC 102. Additionally, the STA management unit 307 changes the parameter number 505 of the STA information with the terminal number 500 "5 (DSC 200)" to "0", thereby updating the STA information (S727). In this case, "0" represents that the connection parameter of a second network is not used.

Then, the management apparatus 105 causes the communication management unit 308 to determine based on the updated information whether a second network has disappeared. Whether a second network has disappeared is determined by referring to the parameter number 505 of the STA information. In FIG. 5, the parameter number 505 of the DSC 200 is "1". This number is used in terminals having the terminal numbers 500 "1 (DISPLAY 101)" and "2 (DVC 102)". This indicates the existence of communication terminals which are performing communication using the connection parameter represented by the parameter number 505 "1". In this case, it can be determined that a network corresponding to the parameter number "1" exists. If the DVC 102 has ended the communication with the DISPLAY 101, and the DVC 102 and the DISPLAY 101 have returned to the first network, the parameter numbers 505 of the terminals having the terminal numbers 500 "1 (DISPLAY 101)" and "2 (DVC 102)" change to "0". In this case, since no communication terminals are performing communication using the connection parameter represented by the parameter number 505 "1", the management apparatus 105 determines that the network corresponding to the parameter number "1" has disappeared. At this time, the management apparatus 105 causes the connection parameter management unit 305 to delete the connection parameter corresponding to the parameter number 401 "1". This enables the management apparatus 105 to manage formation and disappearance of a second network.

Figure 8:
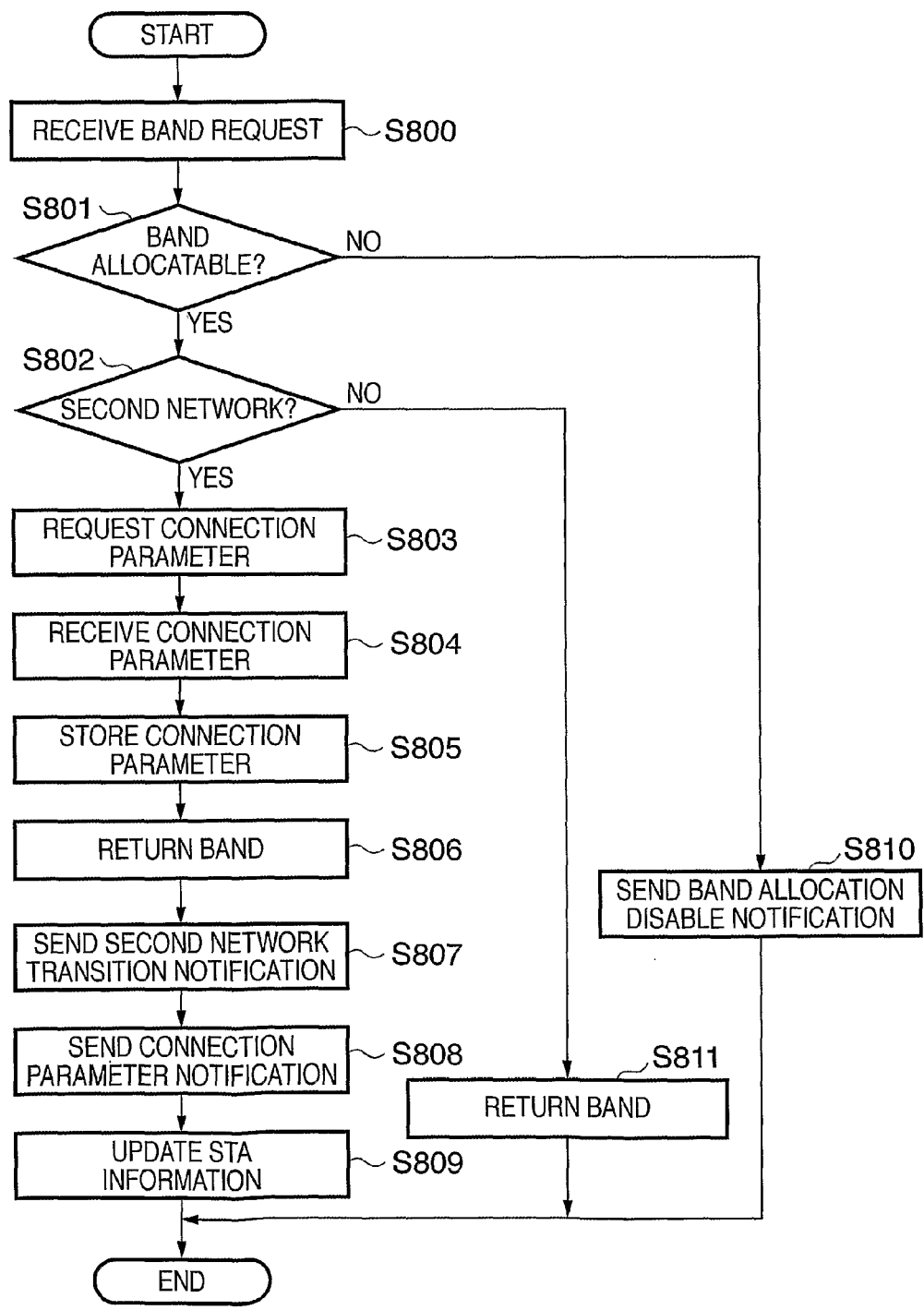
FIG. 8 is a first flowchart illustrating an example of the operation of the management apparatus 105.

An example of the operation of the management apparatus 105 will be described with reference to FIGS. 8 to 10.

The operation of the management apparatus 105 which has received a band request will be described first with reference to FIG. 8.

Upon receiving a band request (S800), the management apparatus 105 causes the communication management unit 308 to determine whether allocation of a communication band to the request source terminal is possible. If communication band allocation is impossible (NO in step S801), the management apparatus 105 notifies the request source terminal that allocation is impossible (S810), and ends the processing. If communication band allocation is possible (YES in step S801), the management apparatus 105 causes the communication management unit 308 to determine whether formation of a second network is necessary. More specifically, it is determined, considering effective use of a band, whether a second network needs to be formed for data communication between the band request source terminal and its communication partner terminal.

If it is unnecessary to form a second network (NO in step S802), the management apparatus 105 causes the communication management unit 308 to return a communication band to the band request source terminal (S811), and ends the processing. If it is necessary to form a second network (YES in step S802), the management apparatus 105 causes the communication management unit 308 to request, of the parameter storage apparatus 106, a connection parameter to be used in the second network (S803). The management apparatus 105 receives the connection parameter from the parameter storage apparatus 106 (S804).

Upon receiving the connection parameter, the management apparatus 105 causes the connection parameter management unit 305 to manage the received connection parameter (S805). Then, the management apparatus 105 causes the communication management unit 308 to return the communication band to the band request source terminal (S806) and also send a second network transition notification (S807). The transition notification in step S807 is sent not only to the band request source terminal but also to the communication partner terminal.

Next, the management apparatus 105 causes the communication management unit 308 to notify the band request source terminal and its communication partner terminal of the connection parameter (S808), and causes the STA management unit 307 to update the STA information (S809). Then, the management apparatus 105 ends the processing.

The operation of the management apparatus 105 which has received a DISCOVERY request will be described next with reference to FIG. 9.

Upon receiving a DISCOVERY request (S900), the management apparatus 105 causes the connection parameter management unit 305 to refer to the connection parameters used in the second networks. If no connection parameter exists, that is, no second network exists (NO in step S901), the processing ends. If a second network exists (YES in step S901), the management apparatus 105 causes the communication management unit 308 to notify the DISCOVERY request source terminal of the connection parameters associated with all second networks (S902), and ends the processing. That is, the management apparatus 105 sends connection parameters necessary for connection to all existing second networks.

The operation of the management apparatus 105 which has received a return notification will be described next with reference to FIG. 10.

Upon receiving a return notification (S1000), the management apparatus 105 causes the band management unit 306 to free the communication band used by the return notification request source terminal (S1001). Next, the management apparatus 105 causes the STA management unit 307 to update the STA information (S1002). At this time, the STA information is updated to return the return notification request source terminal to the initial network.

When the STA information is updated, the management apparatus 105 causes the communication management unit 308 to determine, based on the updated STA information, whether a second network has disappeared. If no second network has disappeared (NO in step S1003), the processing ends. If a second network has disappeared (YES in step S1003), the management apparatus 105 causes the connection parameter management unit 305 to delete the connection parameter of the second network (S1004), and ends the processing.

Figure 11:
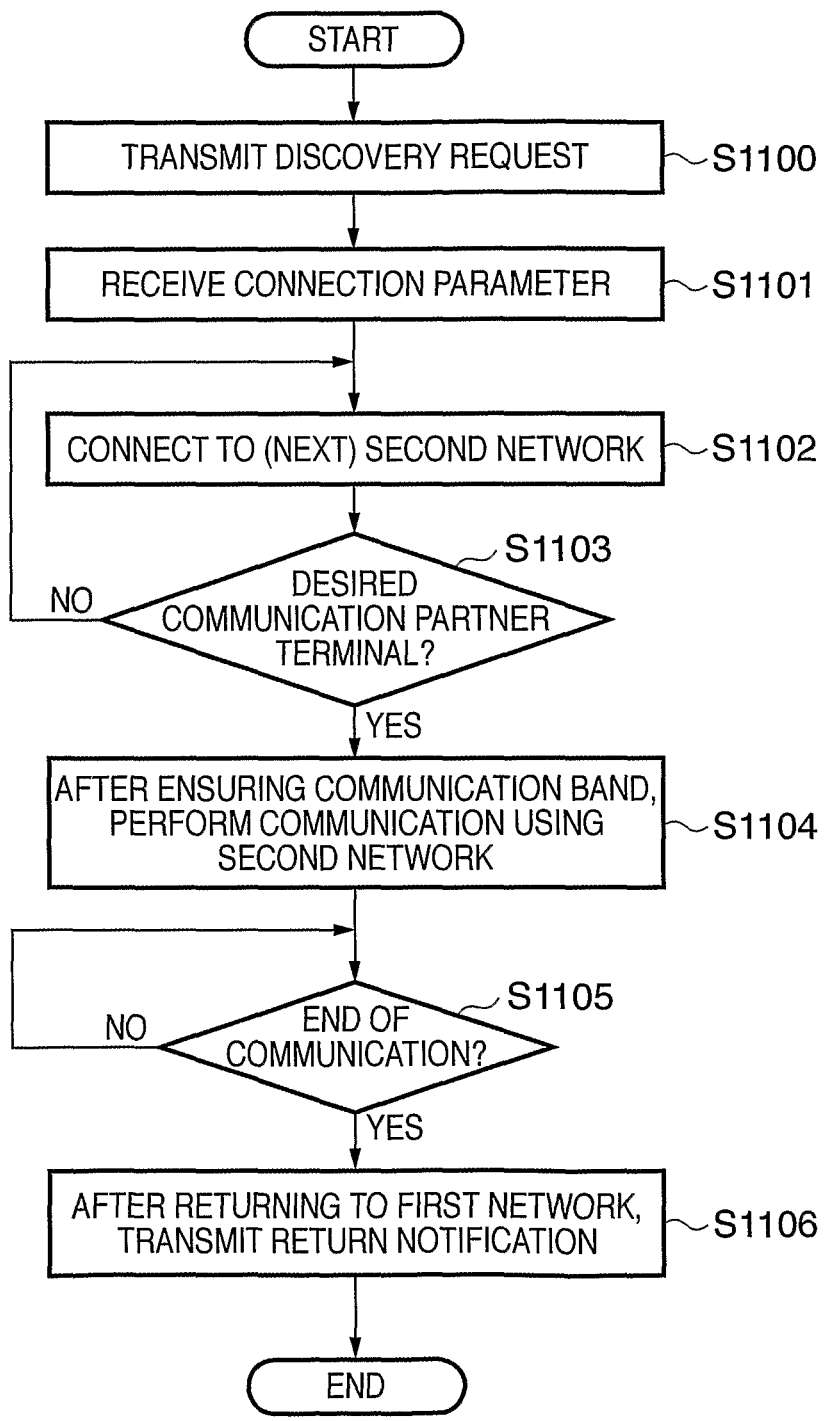
FIG. 11 is a flowchart illustrating an example of the operation of a communication terminal.

An example of the operation of a communication terminal will be described next with reference to FIG. 11. The operation of a communication terminal after transmitting a DISCOVERY request will be described here. Assume that a second network already exists when the communication terminal transmits a DISCOVERY request.

The communication terminal multicasts a DISCOVERY request to the first network (S1100). Upon receiving the request, the management apparatus 105 returns connection parameters used in second networks. As described above, the connection parameters of all existing second networks are returned.

Upon receiving the connection parameter, the communication terminal is connected to the second network using the connection parameter (S1101 and S1102). If there is a plurality of second networks, and a plurality of connection parameters are returned, the communication terminal selects one of the connection parameters based on, for example, a predetermined rule, and is connected to a corresponding one of the second networks.

After connection to the second network, the communication terminal transmits a DISCOVERY request to the network to check whether a desired communication partner terminal exists in the network. If the communication partner terminal is not found (NO in step S1103), the process returns to step S1102 to repeat the above-described processing using another connection parameter.

If the desired communication partner terminal is found (YES in step S1103), the communication terminal ensures a communication band and is connected to the second network again to start communication with the communication partner terminal (S1104). When the communication has ended (S1105), the communication terminal returns to the first network, and transmits a return notification to the management apparatus 105 (S1106), thus ending the processing.

As described above, according to the first embodiment, when one or a plurality of second networks exist, and in this state, a communication terminal transmits a DISCOVERY request to the management apparatus, the management apparatus 105 notifies the request source terminal of the connection parameters associated with all second networks. This allows a communication terminal connected to a second network formed by a communication terminal seceded from a first network to communicate with a communication terminal connected to (especially, newly joined) the first network. The management apparatus 105 can manage formation and disappearance of a second network by a communication terminal of the first network.

In the first embodiment, when returning to the first network, the communication terminal transmits a return notification to the management apparatus 105. However, an ADVERTISE which is first transmitted from the communication terminal after connection to the AP 100 may replace the return notification. In this case, the management apparatus 105 receives an ADVERTISE transmitted from a terminal (discriminable by the parameter number in the STA management unit 307) which has transited to the second network, thereby determining that the communication terminal that has transmitted the ADVERTISE has returned.

Second Embodiment

The second embodiment will be described next. In the second embodiment, an example will be explained in which a device attribute to be searched for is designated in a DISCOVERY request. The arrangements of a communication system and a management apparatus 105 of the second embodiment are the same as in the first embodiment, and a description thereof will not be repeated. A description of the operations of the communication system and the management apparatus 105, which are the same as in the first embodiment, will be omitted, and only different points will be explained.

Processing different from the first embodiment will be described here with reference to FIG. 7A described above. An example will be explained here in which a DSC 200 designates a device attribute to be searched for when transmitting a DISCOVERY request in step S704.

When transmitting a DISCOVERY request in step S704, the DSC 200 designates "UUID 501 is DVC 102" as a device attribute to be searched for. Upon receiving the DISCOVERY request, the management apparatus 105 refers to connection parameter information managed by a connection parameter management unit 305, and determines whether a second network exists. Referring to FIG. 4, two second networks exist. In this case, the management apparatus 105 extracts the device attribute designation information (in this case, the UUID 501 is "DVC 102") from the DISCOVERY request, and compares the extracted information with STA information. If certain STA information matches the extracted information as a result of comparison, all terminal numbers 500 corresponding to the matching information are selected, and all parameter numbers 505 corresponding to it are selected.

As is apparent from the comparison, the extracted device attribute designation information (the UUID 501 is "DVC 102") matches the UUID 501 corresponding to the terminal number 500 "2". The management apparatus 105 selects the parameter number 505 corresponding to the terminal number 500 "2", that is, "1". The management apparatus 105 acquires a connection parameter corresponding to the selected parameter number 505 "1" from the connection parameter management unit 305, and transmits it to the DSC 200.

In the above description, only "2 (DVC 102)" is the terminal number 500 corresponding to the matching information. If a plurality of terminal numbers corresponds to the information, the management apparatus 105 selects all terminal numbers and notifies the DSC 200 of them.

Figure 12:
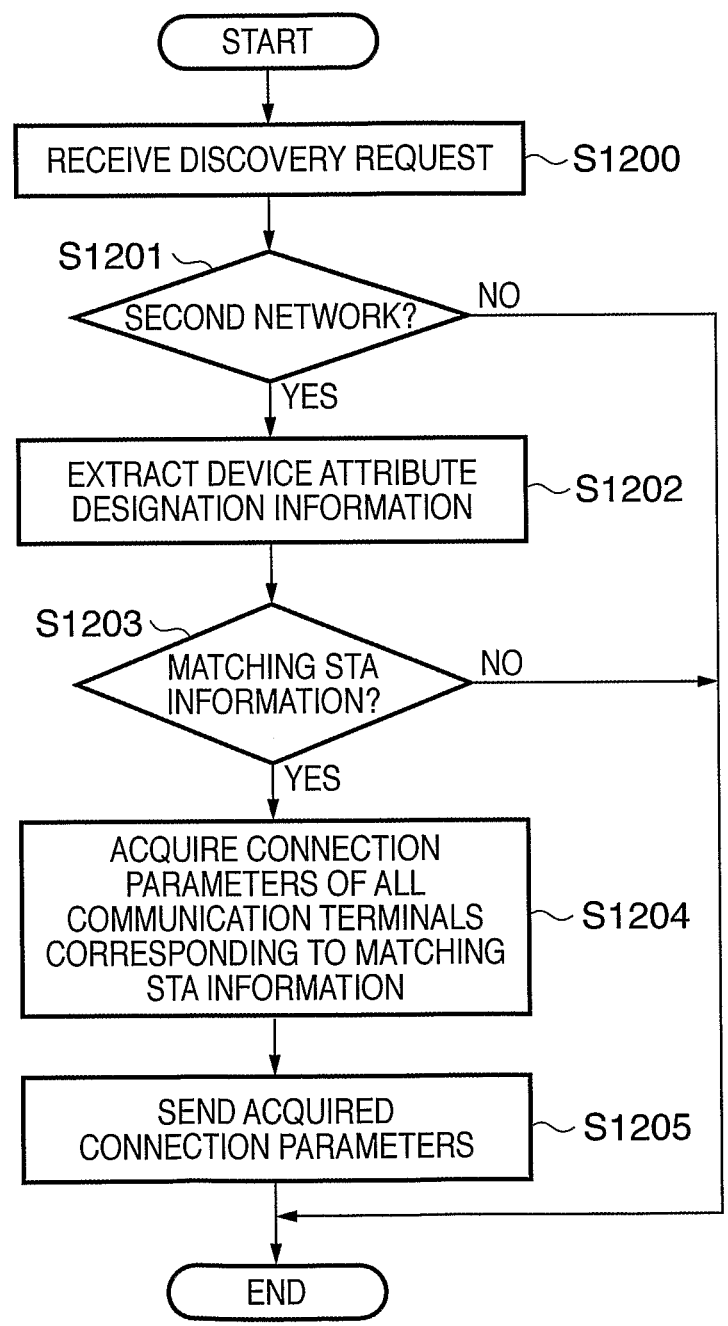
FIG. 12 is a flowchart illustrating an example of the operation of a management apparatus 105 according to the second embodiment.

FIG. 12 illustrates an example of the operation of the management apparatus 105 according to the second embodiment. The operation of the management apparatus 105 which has received a DISCOVERY request including device attribute designation information will be described.

Upon receiving a DISCOVERY request including device attribute designation information (S1200), the management apparatus 105 causes the connection parameter management unit 305 to refer to the connection parameters used in the second networks. If no connection parameter exists, that is, no second network exists (NO in step S1201), the processing ends.

If a second network exists (YES in step S1201), the management apparatus 105 causes a communication management unit 308 to extract the device attribute designation information from the received DISCOVERY request (S1202), and compare the extracted information with STA information. If no STA information matches the extracted information as a result of comparison (NO in step S1203), the processing ends. If certain STA information matches the extracted information (YES in step S1203), the management apparatus 105 causes the communication management unit 308 to select all communication terminals corresponding to the matching information, and acquire connection parameters used by the selected STAs for communication (S1204).

After acquiring the connection parameters, the management apparatus 105 causes the communication management unit 308 to notify the DISCOVERY request source terminal of the acquired connection parameters of the second network (S1205), and ends the processing.

As described above, according to the second embodiment, the device attribute to be searched for is designated in the DISCOVERY request. Hence, the management apparatus 105 can selectively notify the DISCOVERY request source terminal of only the connection parameter associated with a second network based on the designation information. Since the DISCOVERY request source terminal need not be connected to a second network without the desired communication partner terminal, wasteful processing is omitted, and communication can quickly start.

In the example described in the second embodiment, a device attribute to be searched for is designated using a UUID. A device attribute may be designated using another UPnP information element. Alternatively, a device attribute may be designated using address information such as a MAC (Media Access Control) address or an IP (Internet Protocol) address.

Third Embodiment

The third embodiment will be described next. In the third embodiment, an example will be explained in which when returning from a second network to a first network, a return notification is not always transmitted, and instead, transmission is inhibited in accordance with the situation. The arrangements of a communication system and a management apparatus 105 of the third embodiment are the same as in the first embodiment, and a description thereof will not be repeated. A description of the operations of the communication system and the management apparatus 105, which are the same as in the first embodiment, will be omitted, and only different points will be explained.

Assume that a communication terminal temporarily returns to the first network. For example, a DSC 200 which has ended communication with a DVC 102 in the second network is going to newly start communication with a DISPLAY 101. In this case, the DSC 200 must return to the first network and require the management apparatus 105 to ensure a communication band for communication with the DISPLAY 101. However, since the return to the first network is temporary at a high probability, the DSC 200 preferably transmits no return notification. This is because if the DSC 200 transmits a return notification and is then connected to the second network again, the burden of processing of the management apparatus 105 increases. More specifically, upon receiving a return notification, the management apparatus 105 must execute STA information updating processing and band response, and then update the STA information again because the DSC 200 is connected to the second network. If the DSC 200 transmits no return notification, the management apparatus 105 can omit the STA information updating processing and the like.

Figure 13:
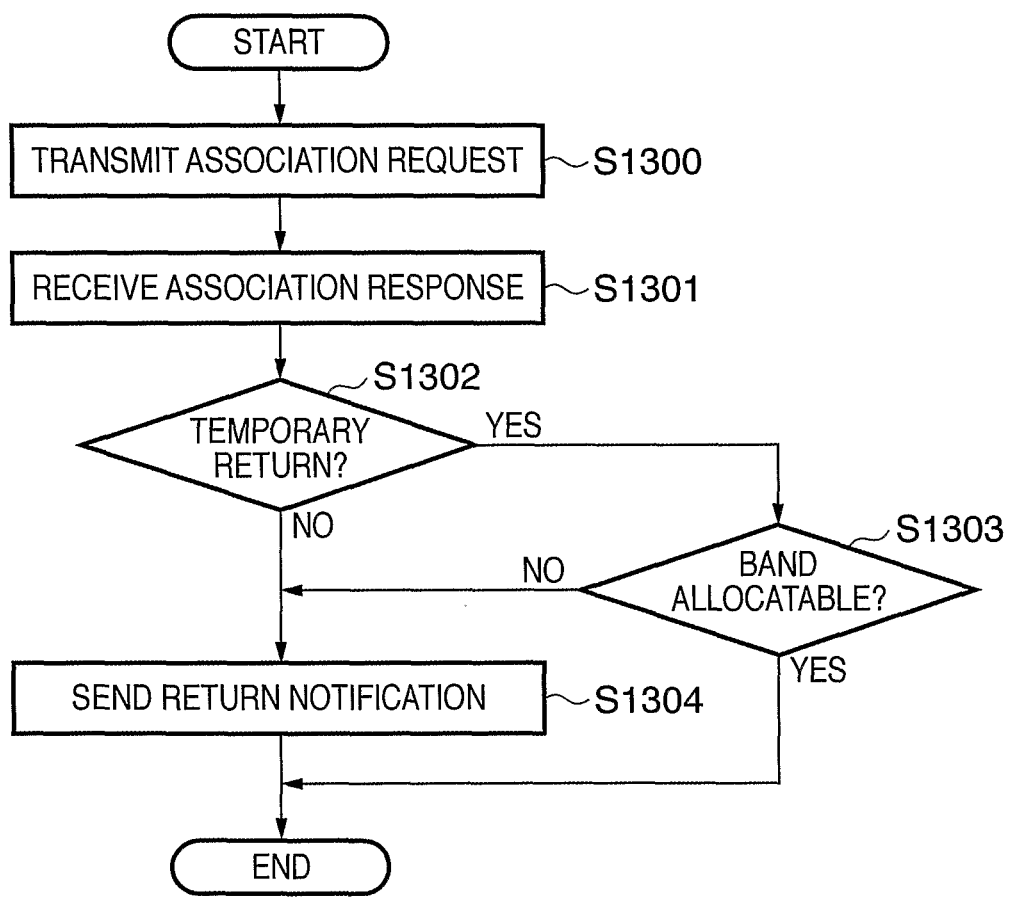
FIG. 13 is a flowchart illustrating an example of the operation of a communication terminal according to the third embodiment.

FIG. 13 illustrates an example of the operation of a communication terminal according to the third embodiment. The operation of a communication terminal which has ended communication in a second network and returns to the first network will be described.

The communication terminal transmits an association request to an AP 100 (S1300), receives a response to the request (S1301), and determines whether return to the first network is temporary. If it is determined that the return is a temporary return to ensure a communication band (YES in step S1302), and the communication band is allocated (YES in step S1303), the communication terminal ends the processing without sending a return notification to the management apparatus 105.

On the other hand, if the return is not temporary (NO in step S1302), or if the return is temporary, but no communication band is allocated (NO in step S1303), the communication terminal transmits a return notification (S1304), and ends the processing.

When the management apparatus 105 is implemented in the AP 100, the communication terminal sends an association request containing information representing whether the return is temporary.

As described above, according to the third embodiment, whether to transmit a return notification is decided by determining whether the return to the first network is temporary. In some cases, the return notification transmission can be omitted. This reduces the burden of processing of the management apparatus 105.

Fourth Embodiment

The fourth embodiment will be described next. In the fourth embodiment, an example will be explained in which a management apparatus 105 sends the connection parameter of a second network to a DISCOVERY request source terminal after determining whether the communication terminal is connectable to the second network.

Figure 14:
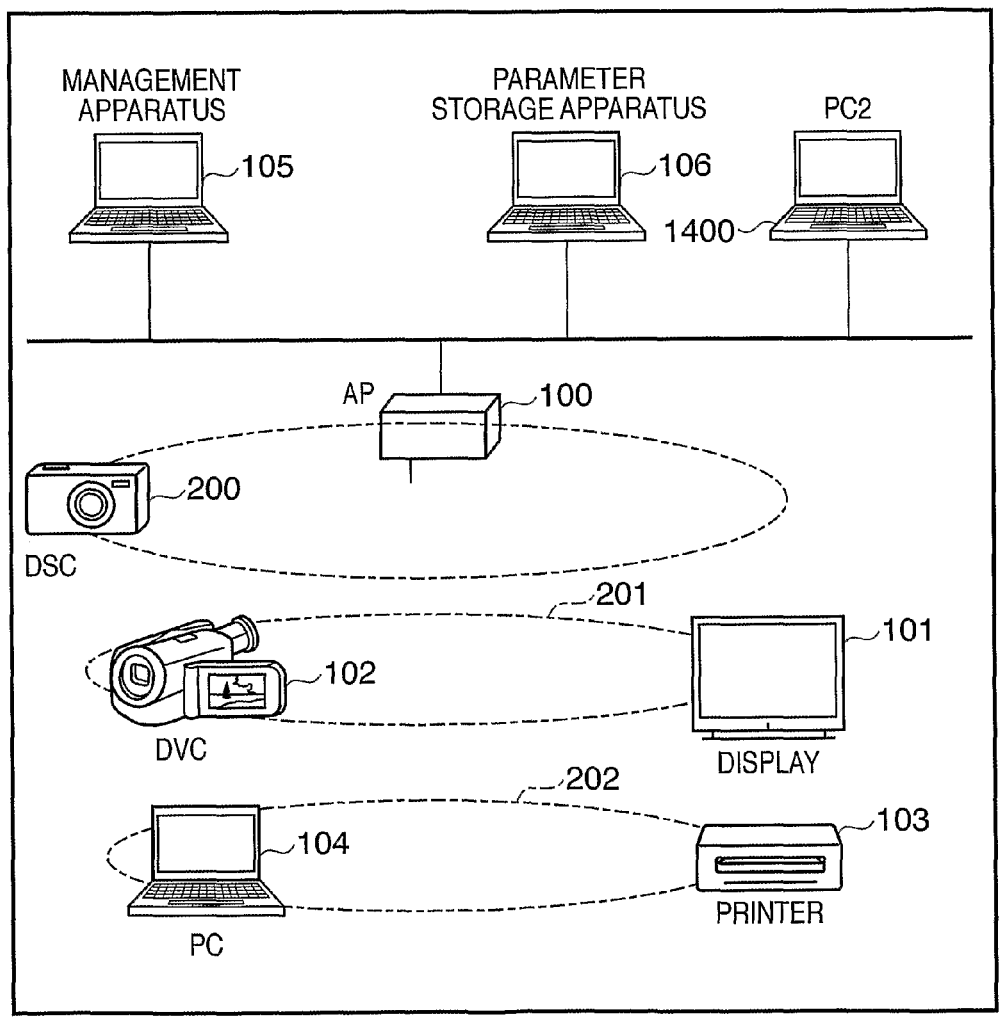
FIG. 14 is a view showing an example of the overall arrangement of a communication system according to the fourth embodiment.

FIG. 14 is a view showing an example of the overall arrangement of a communication system according to the fourth embodiment. A PC 2 1400 is added to the arrangement described in the first embodiment.

The PC 2 1400 is a communication terminal which is connected to the first network after a DISPLAY 101 and a PRINTER 103 have formed second networks 201 and 202, respectively.

The management apparatus 105 causes an STA management unit 307 to manage STA information shown in FIG. 15. The management apparatus 105 also causes a connection parameter management unit 305 to manage connection parameter information shown in FIG. 16. As shown in FIG. 15, the STA management unit 307 additionally manages STA information associated with the PC 2 1400. A connection form 1600 is added as a new item.

Figures 16, 17:
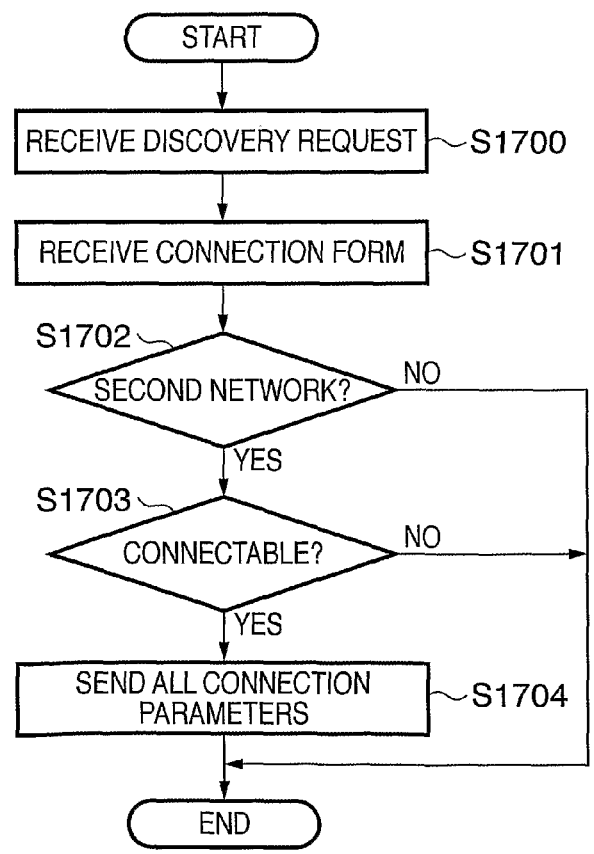
FIG. 16 is a view showing an example of the data structure of connection parameter information according to the fourth embodiment.
FIG. 17 is a flowchart illustrating an example of the operation of a management apparatus 105 according to the fourth embodiment.

FIG. 17 illustrates an example of the operation of the management apparatus 105 according to the fourth embodiment. The operation of the management apparatus 105 which has received a DISCOVERY request will be explained.

This processing starts when a communication terminal connected to the first network transmits an ADVERTISE to the management apparatus 105, multicasts a DISCOVERY request, and sends a notification representing the connection form (wired or wireless) of its own.

Upon receiving the DISCOVERY request and the connection form from the communication terminal (S1700 and S1701), the management apparatus 105 causes the STA management unit 307 to update the STA information. In the STA information associated with the DISCOVERY request source terminal, a terminal number 500 in FIG. 15 corresponds to "6".

Next, the management apparatus 105 causes the connection parameter management unit 305 to determine whether the connection parameter associated with a second network exists. If no connection parameter exists (NO in step S1702), the processing ends. If a connection parameter exists (YES in step S1702), the management apparatus 105 causes a communication management unit 308 to refer to STA information and connection parameter information. This aims at determining whether the DISCOVERY request source terminal is connectable to the second network. According to the STA information shown in FIG. 15, the connection form of the communication terminal whose terminal number 500 is "6" is "wired". According to the connection parameter information shown in FIG. 16, the connection forms 1600 in the connection parameters associated with all second networks are "wireless". Hence, in this case, the management apparatus 105 determines that the communication terminal is not connectable to the second networks 201 and 202 (NO in step S1703), and ends the processing without transmitting the connection parameters to the DISCOVERY request source terminal. On the other hand, upon determining that the communication terminal is connectable (YES in step S1703), the management apparatus 105 causes the communication management unit 308 to notify the DISCOVERY request source terminal of the connection parameters associated with all second networks (S1704), and ends the processing.

As described above, according to the fourth embodiment, the connection parameters of second networks are sent based on the connection form of a communication terminal of the connection parameter notification destination. This inhibits transmission of the connection parameters of second networks to which the communication terminal is not connectable. It is therefore possible to omit wasteful connection processing of the communication terminal.

In the fourth embodiment, an example has been described in which the presence/absence of connection parameter notification is switched based on the connection form of the communication terminal. This processing may be done based on information other than the connection form. For example, the communication terminal may send an encryption method supported by it to the management apparatus 105. In this case, the management apparatus 105 performs the above-described processing based on the encryption method supported by the communication terminal.

Examples of the typical embodiments of the present invention have been described above. The present invention is not limited to the above-described embodiments shown in the drawings, and changes and modifications can be made as needed without departing from the spirit and scope of the present invention.

For example, in the first to fourth embodiments, the parameter storage apparatus 106 is present separately from the management apparatus 105. However, the management apparatus 105 may incorporate the function implemented by the parameter storage apparatus 106.

In the first to fourth embodiments, UPnP is used as the device search protocol of a search request. However, any other device search protocol may be used.

Figure 9:
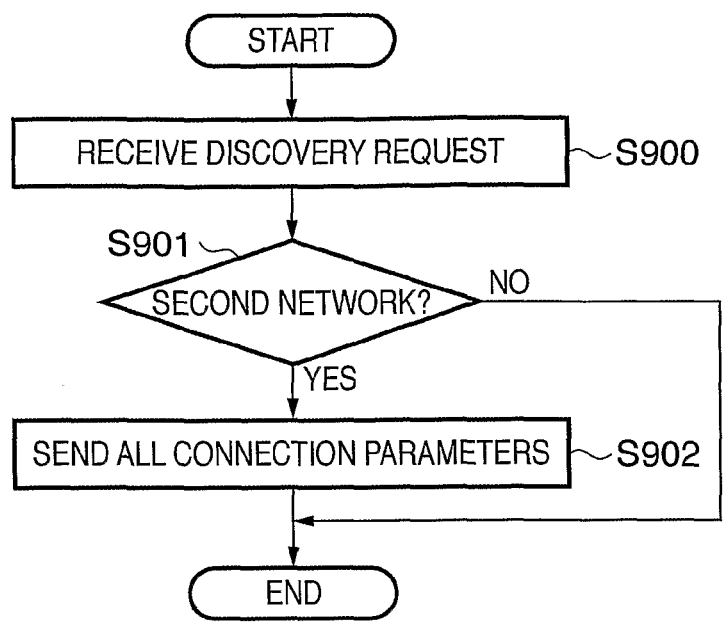
FIG. 9 is a second flowchart illustrating an example of the operation of the management apparatus 105.
Figure 10:
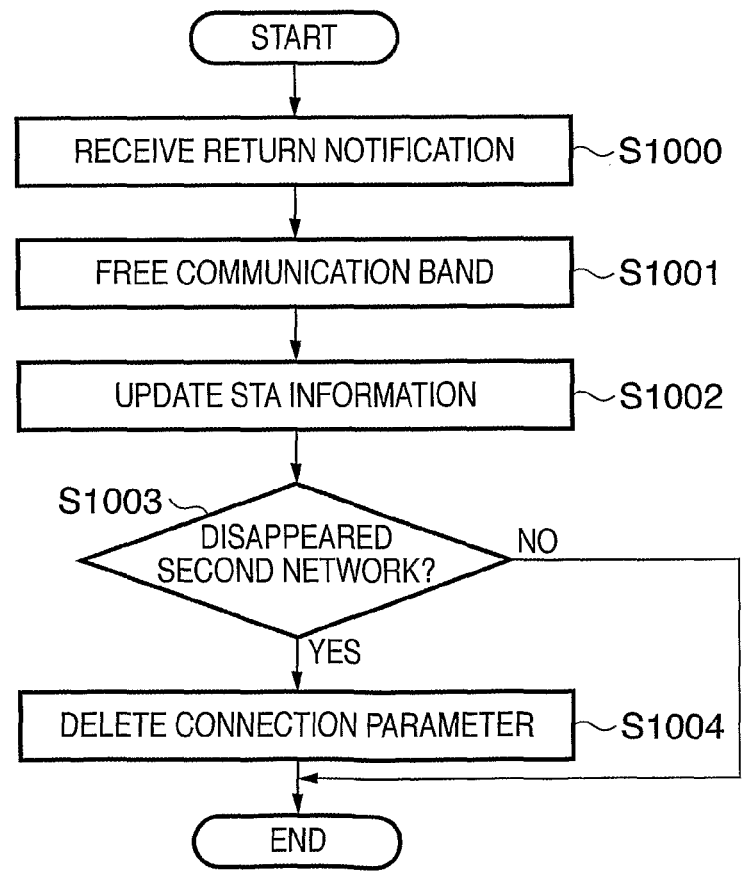
FIG. 10 is a third flowchart illustrating an example of the operation of the management apparatus 105.

In the first to fourth embodiments, in response to a search request from a communication terminal, the management apparatus 105 transmits a connection parameter associated with a second network to the request source terminal (e.g., FIG. 9). This notification need not always be done in response to the request. For example, a connection request from an upper layer for the communication I/F, such as a connection establishment request of TCP, may be used. More specifically, the management apparatus 105 may transmit a connection parameter associated with a second network to the request source terminal in response to at least one of a search request and a connection request.

In the first to fourth embodiments, the management apparatus 105 is present separately from the AP 100. However, the AP 100 may incorporate the function implemented by the management apparatus 105. In this case, a return notification may be an association request. The AP 100 receives an association request from a communication terminal which has transited to a second network, thereby determining the return of the communication terminal.

The present invention can take a form of, for example, a system, apparatus, method, program, or storage medium. More specifically, the present invention is applicable to a system including a plurality of devices, or an apparatus including a single device.

The present invention also incorporates a case in which the functions of the above-described embodiments are achieved by supplying a software program to the system or apparatus directly or from a remote site and causing the computer of the system or apparatus to read out and execute the supplied program code. In this case, the supplied program is a computer program corresponding to the flowcharts and sequence charts illustrated in the embodiments.

Hence, the program code itself, which is installed in the computer to implement the functional processing of the present invention by the computer, also implements the present invention. That is, the present invention incorporates the computer program itself for implementing the functional processing of the present invention. In this case, the program can take any form such as an object code, a program to be executed by an interpreter, or script data to be supplied to the OS (Operating System) as long as the functions of the program can be obtained.

Examples of the computer-readable storage medium to supply the computer program are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

As another program supply method, a client computer may be connected to a homepage on the Internet by using a browser to download the computer program of the present invention from the homepage to a storage medium such as a hard disk. In this case, the program to be downloaded may be a compressed file containing an automatic installation function. The program code contained in the program of the present invention may be divided into a plurality of files, and the files may be downloaded from different homepages. That is, the present invention also incorporates a WWW server which causes a plurality of users to download a program file that implements the functional processing of the present invention by a computer.

The program of the present invention may be encrypted, stored in a storage medium such as a CD-ROM, and delivered to users. Any user who satisfies predetermined conditions may be allowed to download key information for decryption from a homepage via the Internet so that he/she can execute the encrypted program by using the key information and install it in the computer.

The functions of the above-described embodiments can be implemented not only when the computer executes the read-out program but also in cooperation with, for example, the OS running on the computer based on the instructions of the program. In this case, the OS or the like partially or wholly executes actual processing, thereby implementing the functions of the above-described embodiments.

Alternatively, some or all of the functions of the above-described embodiments may be implemented by writing the program read out from the storage medium in the memory of a function expansion board inserted into the computer or a function expansion unit connected to the computer. In this case, after the program is written in the function expansion board or function expansion unit, the CPU (Central Processing Unit) of the function expansion board or function expansion unit partially or wholly executes actual processing based on the instructions of the program.

The above-described technique allows a communication terminal connected to a second network formed by a communication terminal seceded from a first network to communicate with a communication terminal connected to the first network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-095433, filed on Apr. 1, 2008, which is hereby incorporated by reference herein in its entirety.

The invention claimed is:

1. A management apparatus comprising:
a management unit configured to manage a connection parameter for connecting to a second wireless network, the connection parameter including an SSID (Service Set Identifier) of the second wireless network and an encryption key for performing encrypted communication in the second wireless network, wherein the second wireless network is created by a first communication apparatus differing from the management apparatus, and wherein the first communication apparatus is connected to as a station and then disconnected from a first wireless network that the management apparatus has created as an access point, and newly creates the second wireless network as an access point; and
a notification unit configured to, in response to receiving a request from a second communication apparatus connected to the first wireless network, notify the second communication apparatus of the connection parameter managed by said management unit to cause the second communication apparatus to disconnect from the first wireless network and then to connect to the second wireless network,
wherein the second communication apparatus is different from the management apparatus and the first communication apparatus, wherein the management apparatus connects to the first wireless network but does not connect to the second wireless network, and wherein at least one of the management unit and the notification unit is executed by a processor.

2. The apparatus according to claim 1, further comprising a transition notification unit configured to notify the first communication apparatus of transition to the second wireless network.

3. The apparatus according to claim 2, wherein upon receiving, from the second communication apparatus which has transitioned to the second wireless network based on the notification by said transition notification unit, a return notification to request return to the first wireless network, said management unit updates the connection parameter associated with the second wireless network based on the return notification.

4. The apparatus according to claim 3, wherein after updating the connection parameter associated with the second wireless network, said management unit (i) determines, based on the updated connection parameter, whether the second wireless network has disappeared, and (ii) in a case where it is determined that the second wireless network has disappeared, deletes the connection parameter associated with the second wireless network.

5. The apparatus according to claim 1, wherein the request from the second communication apparatus is one of a search request and a connection request.

6. The apparatus according to claim 1, wherein in notification of the connection parameter, if said management unit manages a plurality of connection parameters associated with the second wireless network, said notification unit notifies the second communication apparatus of all the plurality of connection parameters.

7. The apparatus according to claim 1, wherein the request from the second communication apparatus includes designation information representing a communication apparatus serving as a communication partner, and wherein in notification of the connection parameter, if said management unit manages a plurality of connection parameters associated with the second wireless network, said notification unit selectively notifies the second communication apparatus of connection parameters based on the designation information.

8. The apparatus according to claim 1, wherein in notification of the connection parameter, said notification unit selectively notifies the second communication apparatus of connection parameters associated with the second wireless network, which are managed by said management unit, based on one of a connection form and an encryption method of the second communication apparatus.

9. A non-transitory computer-readable storage medium storing a computer program, the computer program causing a computer to function as a management apparatus comprising:

a management unit configured to manage a connection parameter for connecting to a second wireless network, the connection parameter including an SSID (Service Set Identifier) of the second wireless network and an encryption key for performing encrypted communication in the second wireless network, wherein the second wireless network is created by a first communication apparatus differing from the management apparatus, and wherein the first communication apparatus is connected to as station and then disconnected from a first wireless network that the management apparatus has created as an access point, and newly creates the second wireless network as an access point; and a notification unit configured to, in response to receiving a request from a second communication apparatus connected to the first wireless network, notify the second communication apparatus of the connection parameter managed by said management unit to cause the second communication apparatus to disconnect from the first wireless network and then to connect to the second wireless network, wherein the second communication apparatus is different from the management apparatus and the first communication apparatus, and wherein the management apparatus connects to the first wireless network but does not connect to the second wireless network.

10. A management method of a management apparatus, the method comprising:

a management step of managing a connection parameter for connecting to a second wireless network, the connection parameter including an SSID (Service Set Identifier) of the second wireless network and an encryption key for performing encrypted communication in the second wireless network, wherein the second wireless network is created by a first communication apparatus differing from the management apparatus, and wherein the first communication apparatus is connected to as station and then disconnected from a first wireless network that the management apparatus has created as an access point, and newly creates the second wireless network as an access point; and a notification step of, in response to receiving a request from a second communication apparatus connected to the first wireless network, notifying the second communication apparatus of the connection parameter managed in the management step to cause the second communication apparatus to disconnect from the first wireless network and then to connect to the second wireless network, wherein the second communication apparatus is different from the management apparatus and the first communication apparatus, and wherein the management apparatus connects to the first wireless network but does not connect to the second wireless network.

11. A communication system including a communication apparatus and a management apparatus, wherein said management apparatus comprises:

(a) a management unit configured to manage a connection parameter for connecting to a second wireless network, the connection parameter including an SSID (Service Set Identifier) of the second wireless network and an encryption key for performing encrypted communication in the second wireless network, wherein the second wireless network is created by a first communication apparatus differing from the management apparatus, and wherein a first communication apparatus is connected to as station and then disconnected from a first wireless network that the management apparatus has created as an access point, and newly creates the second wireless network as an access point; and (b) a notification unit configured to, in response to receiving a request from a second communication apparatus connected to the first wireless network, notify the second communication apparatus of the connection parameter managed by said management unit to cause the second communication apparatus to disconnect from the first wireless network and then to connect to the second wireless network, wherein said second communication apparatus comprises:
(a) a reception unit configured to receive the connection parameter notified by said notification unit; and
(b) a connection unit configured to connect to the second wireless network using the connection parameter associated with the second wireless network which is received by said reception unit,
wherein the second communication apparatus is different from the management apparatus and the first communication apparatus,
wherein the management apparatus connects to the first wireless network but does not connect to the second wireless network, and
wherein at least one of the management unit and the notification unit is executed by a processor.

* * * * *